Aug. 2, 1966     A. J. FREI, SR     3,263,443
REFRIGERATING APPARATUS
Filed July 10, 1964     3 Sheets-Sheet 1
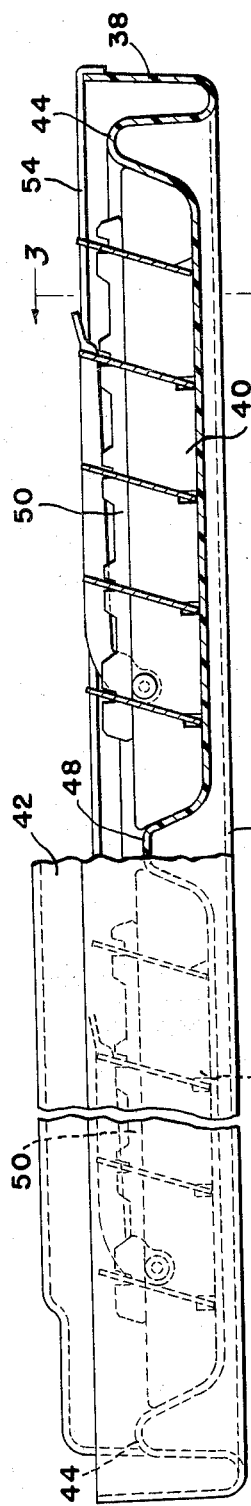
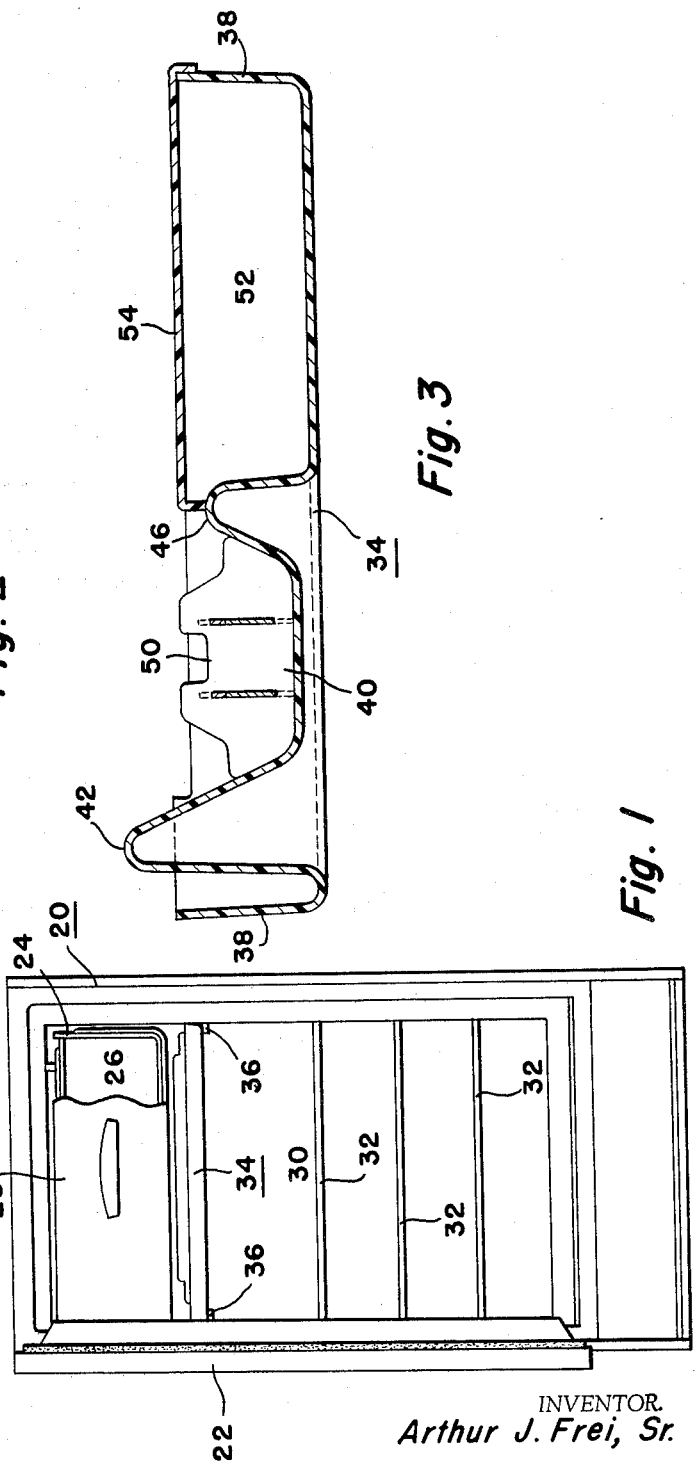
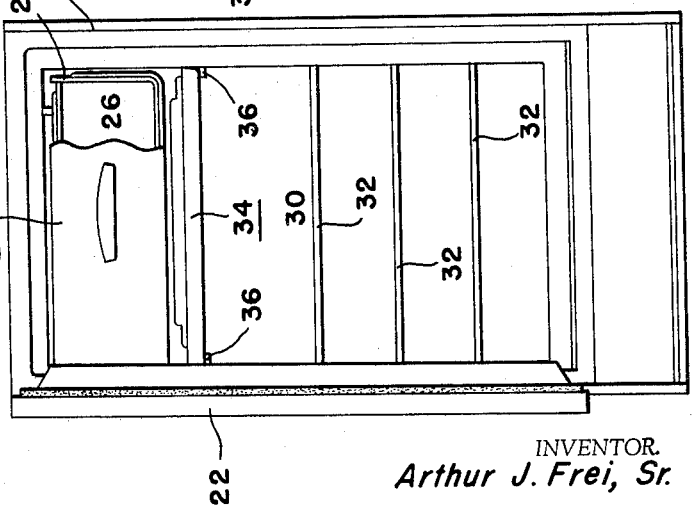
INVENTOR.
Arthur J. Frei, Sr.
BY
His Attorney

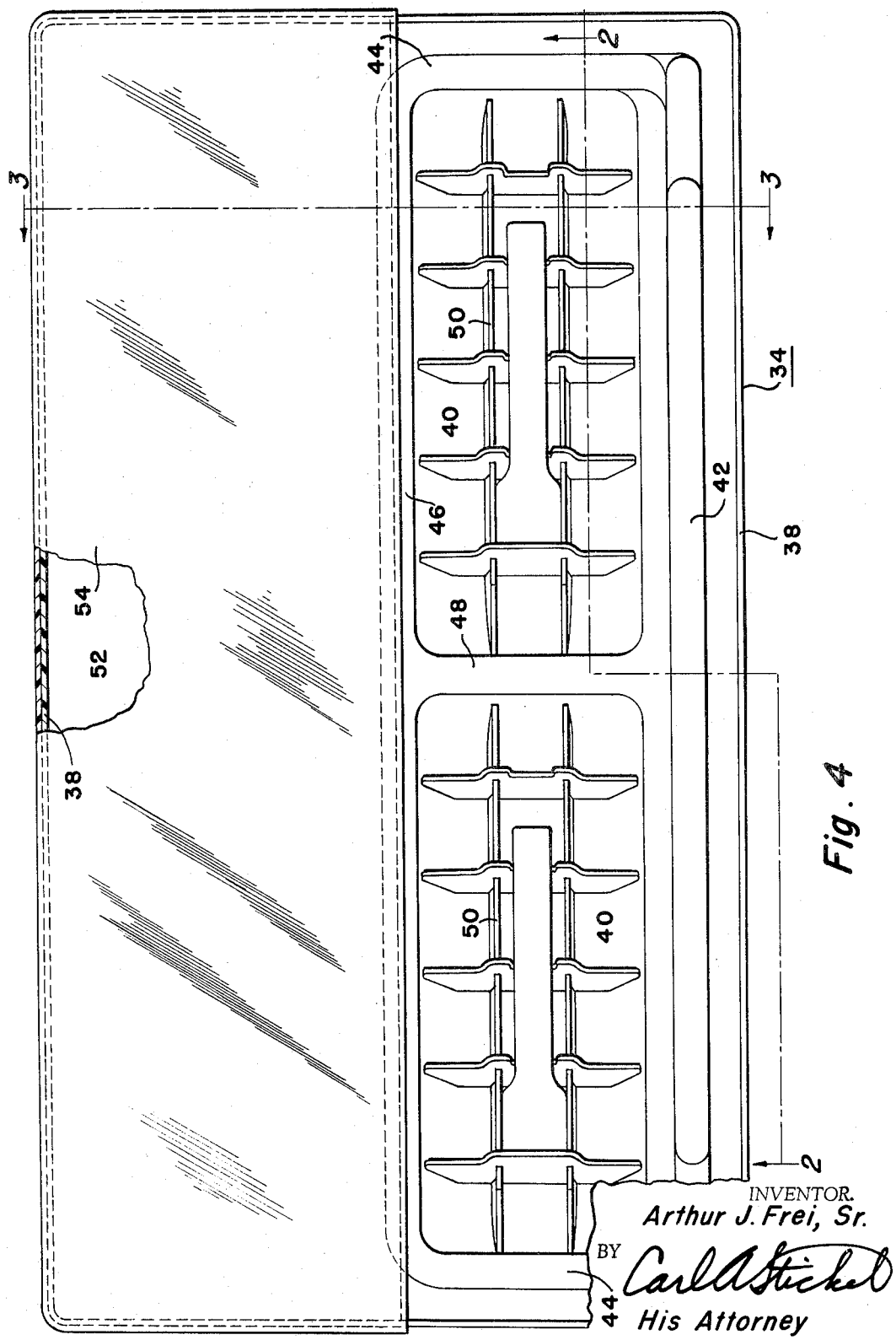

Aug. 2, 1966  A. J. FREI, SR  3,263,443
REFRIGERATING APPARATUS
Filed July 10, 1964  3 Sheets-Sheet 3
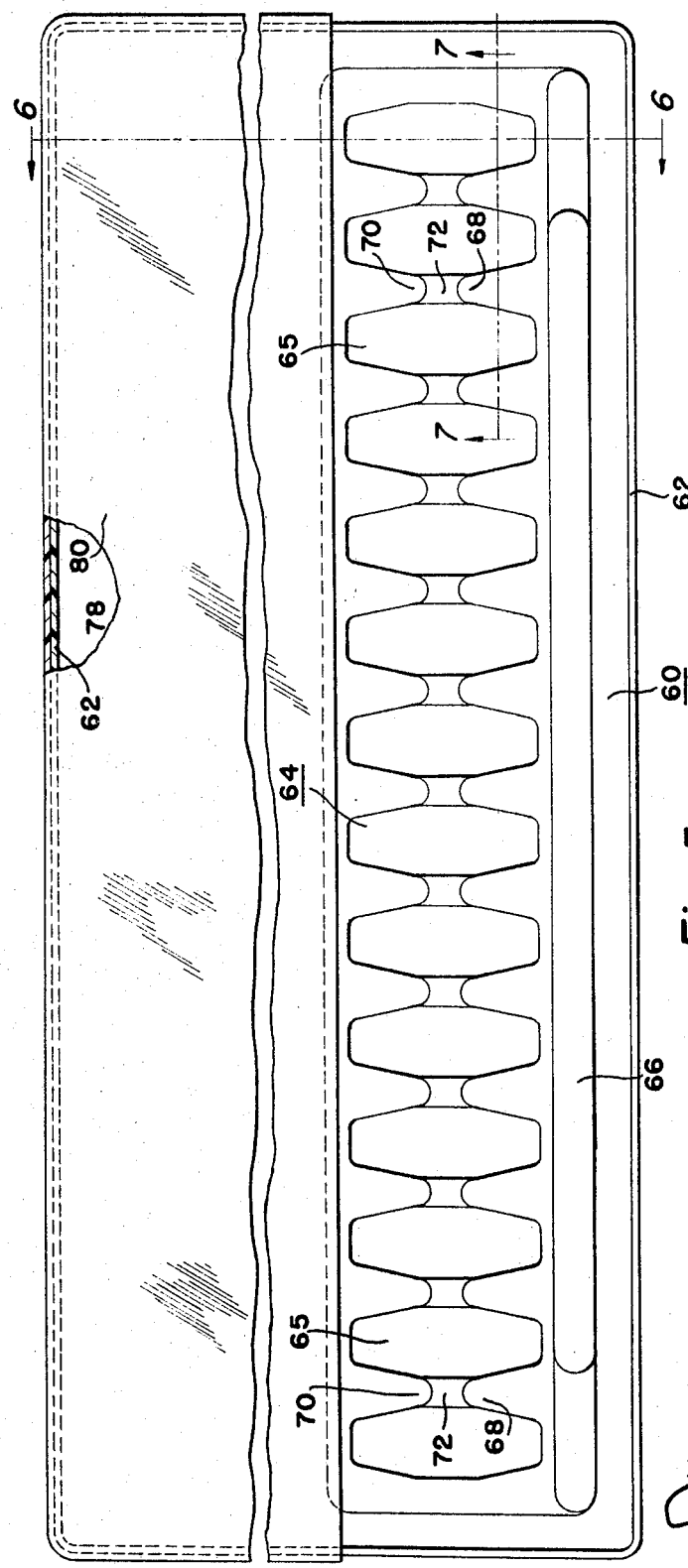
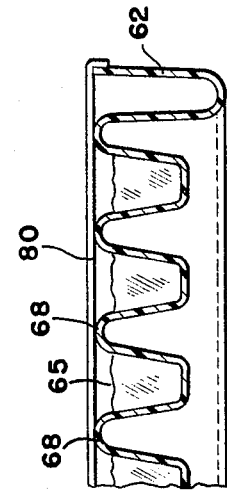
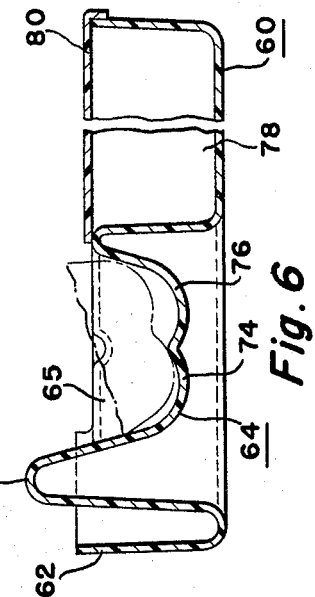
INVENTOR.
Arthur J. Frei, Sr.
BY Carl A. Stickel
His Attorney

United States Patent Office 3,263,443
Patented August 2, 1966

3,263,443
REFRIGERATING APPARATUS
Arthur J. Frei, Sr., Dayton, Ohio, assignor to General Motors Corporation, Detroit, Mich., a corporation of Delaware
Filed July 10, 1964, Ser. No. 381,627
1 Claim. (Cl. 62—417)

This invention pertains to refrigerating apparatus and more particularly to a household refrigerator provided with an arrangement for the freezing and storage of frozen cubes or pieces and frozen comestibles.

The quantity of frozen cubes or pieces and frozen comestibles needed or desired varies greatly with different families. It also varies greatly from day to day and season to season in any one family. For example, the family may have frequent or infrequent gatherings or large parties for which a large supply of frozen cubes is desired. It may be difficult or undesirable to provide such a supply solely from trays provided in the freezing compartment.

It is an object of this invention to provide a simple, inexpensive arrangement for the freezing and storage of an additional supply of frozen foods and comestibles or a substitute for the normal arrangement which will not occupy any especially valuable storage space in the refrigreator.

This and other objects are attained in the forms shown in the drawings in which the refrigerator below the conventional evaporator is provided a simple one piece shallow drawer or tray of sheet material provided with one or more pockets for frozen cubes or pieces and comestibles. The pockets are provided with removable cube ejection grids or are provided with interconnected smaller pockets from which small frozen pieces may be removed individually.

Further objects and advantages of the present invention will be apparent from the following description, reference being had to the accompanying drawings wherein preferred embodiments of the present invention are clearly shown.

In the drawings:

FIGURE 1 is a front view with the door open of a household refrigerator embodying one form of my invention;

FIGURE 2 is an enlarged front view partly in elevation and partly in vertical section of the tray shown in FIGURE 1 embodying one form of my invention;

FIGURE 3 is a transverse sectional view taken along the line 3—3 of FIGURES 2 and 4;

FIGURE 4 is a top view of the tray shown in FIGURES 2 and 3;

FIGURE 5 is a top view similar to FIGURE 4 of a modified form of tray having a pocket with individual interconnected sub-compartments for the freezing of pieces;

FIGURE 6 is a transverse sectional view taken along the line 6—6 of FIGURE 5; and FIGURE 7 is a transverse fragmentary vertical sectional view taken along the line 7—7 of FIGURE 5.

Referring now to the drawings and more particularly to FIGURE 1, there is shown a household refrigerator cabinet 20 provided with a front outer door 22 and having in its upper portion a sheet metal evaporator 24 extending around a freezing compartment 26 located within the evaporator 24 between the rear wall and a front inner door 28. The evaporator 24 may be similar to that shown in Patent No. 2,712,736, issued July 12, 1955. The refrigerator 20 includes top, bottom, side and rear insulated walls enclosing a single large compartment containing the evaporator 24 in its upper portion. To make possible the frozen storage and the freezing of water, the evaporator 24 is normally maintained at below water freezing temperatures. The compartment 30 beneath the evaporator 24 contains shelves 32 for supporting articles and food at above freezing temperatures.

For the purpose of preventing this compartment 30 from being cooled to below freezing temperatures by the evaporator 24, it has been customary to provide some sort of baffle or partition between the evaporator 24 and the compartment 30 for restricting the circulation of cold air from the evaporator 24 sufficiently to keep the compartment 30 refrigerated at above water freezing temperatures.

It has been customary to provide freezing trays within the evaporator 24 for the purpose of freezing water to form ice cubes. Often such a supply as may be provided by such trays is insufficient when many guests are expected. Furthermore, some families need the entire space within the freezing compartment 26 for the storage of frozen foods. According to my invention, I provide a shallow removable tray 34 supported on a plurality of pegs 36 extending inwardly from the side walls of the refrigerator which not only serves the purpose of restricting the air circulation between the evaporator 24 and the compartment 30, but also provides an arrangement for freezing water and other liquids and comestibles without interfering with the normal use of the refrigerator.

This tray 34 or drawer is preferably slidably mounted on the pegs 36 and made of a single sheet of a suitable material such as high density linear polyethylene or suitably coated sheet aluminum. The coating of the aluminum may be a form of adherent wax or other forms of ice releasing agent. The high density linear polyethylene preferably has a smooth surface which will provide good ice release properties. The tray 34 includes an upwardly extending perimeter wall 38 extending around the four sides of the tray. The tray also includes two laterally extending shallow pockets or receptacles 40 for the reception of liquid to be frozen. These pockets 40 are preferably surrounded by a high raised hollow wall 42 extending across the tray between the upwardly extending front wall and the pockets or receptacles 40 and lower hollow wall sections 44 extending across the ends of the pockets 40 which connect with the upwardly extending hollow wall 46 extending across the rear of the pockets 40. The two pockets 40 are separated by a hollow wall 48 between them. The two pockets 40 each contain a movable ice cub ejecting grid 50 which may be of the type shown in Patent No. 2,642,727, issued June 23, 1953.

When the grids 50 are located in the pockets 40 and the pockets are substantially filled with water or other liquid or comestibles to be frozen, the cold air between the evaporator 24 and the tray 34 will freeze the liquid in between the separators of the grid into cubes. Sufficient air will pass around the tray 34 to keep the compartment 30 at satisfactory above freezing refrigeration temperatures. After the liquid is frozen in the pockets 40, the handle of each of the grids 50 may be operated to break the cubes loose from the grid and from the walls of the pockets 40. The grids 50 may then be removed and as many of the cubes as is required may be removed. The remaining cubes may be retained in the pockets 40 until needed.

Between the hollow wall 46 and the rear wall 38 is provided a second or larger compartment 52. This compartment 52 is provided with a removable cover 54 which when applied will prevent freezing within the compartment 52 for keeping unfrozen products cold. This compartment 52 when the removable cover 54 is removed is used to retain frozen products at below freezing temperatures.

In FIGURES 5 to 7, a modified form of a tray is shown in which no metal grids are provided. In this tray 60 within the upwardly extending perimeter wall 62 extending around the four sides or edges thereof there is provided a pocket or receptacle 64 which includes a hollow front wall 66 and a plurality of smaller sub-compartments 65 extending in a series across the front of the tray behind the wall 66 which are separated from each other by hollow wall projections 68 and 70 extending respectively rearwardly and forwardly to divide the compartment 64 into the sub-compartment 65. A small weir 72 is provided between each of the hollow wall projections 68 and 70 to connect the sub-pockets or receptacles 66. Thus through the weirs 72, each of the sub-pockets or receptacles 65 can be readily filled from a single source. The sub-pockets or receptacles 65 are provided with a double rounded bottom wall as is best shown in FIGURE 6. The two bottom curved wall portions 74 and 76 extending from the side walls of the pocket or receptacle 64 meet substantially at the axis of the weirs 74 to form pieces of ice which can be readily removed by applying force at the one end of each piece so as to cause it to be rotated substantially about the axis of the adjacent weirs. This will break the pieces loose from the walls of the individual sub-pocket or receptacle 65 and will also break the frozen connection with the pieces in the other pockets extending through the weirs 72. Through this arrangement the pieces may readily be removed individually as needed.

The space behind the pocket or receptacle 64 is formed into a large pocket or receptacle 78 extending across the rear of the tray 60 for providing for the storage of the other articles to be kept in a frozen condition. This receptacle 78 may be covered by the cover 80 whenever it is desired to prevent articles or food stored in the receptacle 78 from freezing. It should be noted that the tray 60 is composed entirely of a single sheet of material which may be readily vacuum formed if made out of high density linear polyethylene. However, it may also be made of suitably coated aluminum or other suitable plastic material.

Either of the trays shown may be used either to supplement the supply of ice cubes which may be frozen in the freezing compartment 26 or they may be used as a substitute for freezing normally performed in the compartment 26.

While the embodiments of the present invention as herein disclosed constitute preferred forms, it is to be understood that other forms might be adopted.

What is claimed is as follows:

A refrigerator including an insulated cabinet having insulating walls and a door opening and an insulated door enclosing a compartment, refrigerating means for establishing below freezing temperature in the upper part of said compartment, a horizontal tray mounted in said compartment directly beneath said refrigerating means in a below freezing temperature zone for preventing the cooling of the compartment beneath to below freezing temperatures, means for mounting said tray for lateral movement out said door opening, said tray being provided with a plurality of liquid comestible receiving pockets containing means for separating the frozen contents into pieces, said tray having means for preventing liquid flow between said pockets, said tray having the liquid receiving pockets at the front and having a large storage pocket at the rear, and a removable cover for said storage pocket.

References Cited by the Examiner

UNITED STATES PATENTS

| 2,163,705 | 6/1939 | Saler | 62—368 |
| 2,799,145 | 7/1957 | Jansen | 62—465 X |
| 2,889,693 | 6/1959 | Kurowski | 62—408 |

ROBERT A. O'LEARY, *Primary Examiner.*